Sept. 4, 1945. R. A. GOEPFRICH 2,384,297
BRAKE
Filed June 29, 1942

INVENTOR.
RUDOLPH A. GOEPFRICH
BY
M. W. McConkey
ATTORNEY.

Patented Sept. 4, 1945

2,384,297

UNITED STATES PATENT OFFICE 2,384,297

BRAKE

Rudolph A. Goepfrich, South Bend, Ind., assignor to Bendix Aviation Corporation, South Bend, Ind., a corporation of Delaware Application June 29, 1942, Serial No. 448,899

7 Claims. (Cl. 188—79.5)

This invention relates to disk type friction devices, particularly brakes, and embodies an improvement in means for adjusting such devices to compensate for wear.

The chief object of the invention is to provide means for automatically adjusting a disk brake. The means for accomplishing automatic adjustment is simple and uncomplicated, but at the same time capable of efficient operation. Generally speaking the invention comprehends a disk brake automatic adjustment having an element which is movable relative to an axially movable member of the brake whenever the element contacts an axially fixed member of the brake, and a one-way clutch connection between the element and the axially movable member, the position of the element being determinative of the released position of the axially movable member.

Other objects and features of my invention will be apparent during the course of the description. In the drawings.

Figure 1:
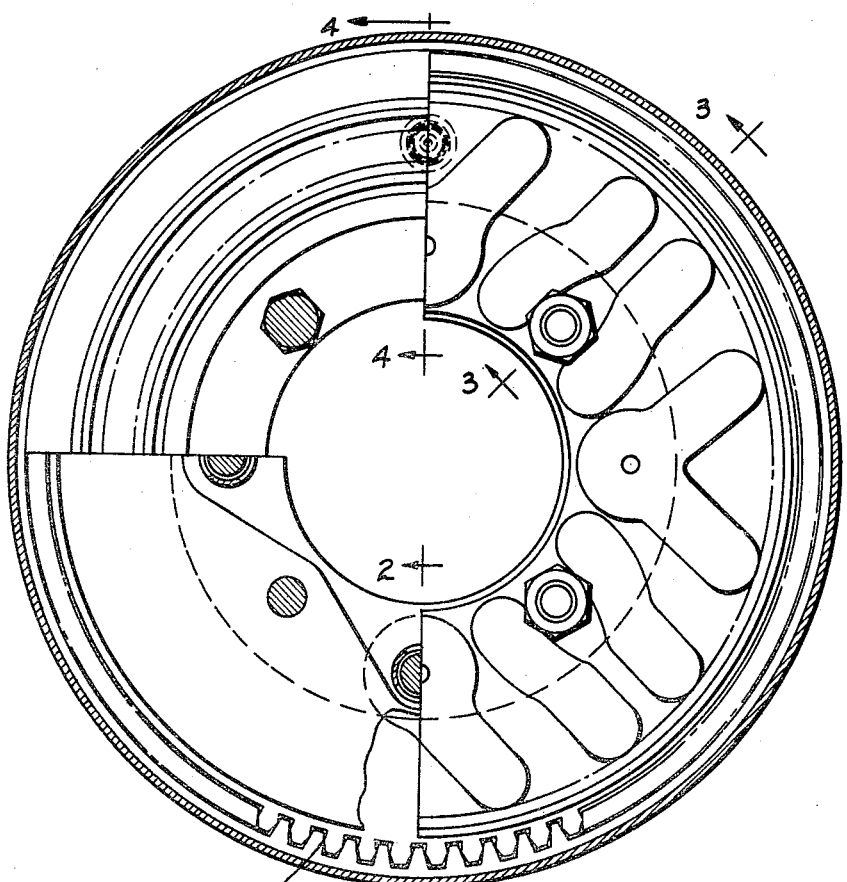
Figure 1 is a composite view partly in section taken on various planes parallel to the plane in which the brake drum rotates.
Figure 2:
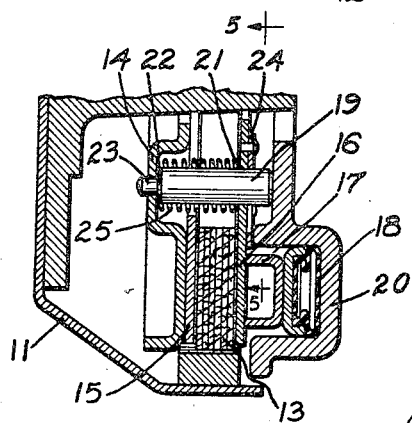
Figures 2, 3 and 4 are sections taken on the lines 2—2, 3—3, 4—4 respectively of Figure 1.
Figure 3:
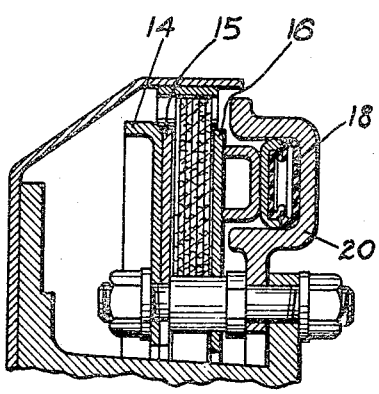
Figure 5:
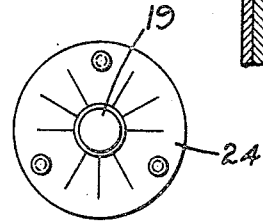
Figure 5 is an end elevation showing a washer and plunger combination which constitute an important part of my invention.
Figure 4:
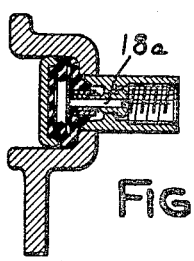

The brake shown includes a rotatable drum 11 having keyed thereto by means of a plurality of keys 12 extending into channels in the rotor disk, a rotor disk 13 which, as shown, may be made up entirely of material having a high coefficient of friction of the type usually used for brake lining. A fixed support 14 which is incapable of either rotating or axially sliding movement is bolted to a stationary supporting plate 20 (see Figure 3), and has secured thereto, preferably by welding, a friction disk 15 which is adapted to act as a stator disk and faces the rotor disk 13. A second stator disk 16 is positioned on the opposite side of the rotor disk and is secured against rotation but is capable of axial movement toward and away from the rotor disk 13. The applying means for the brake may consist of an annular metal member 17 which bears against the disk 16 and which is movable in the direction of said disk by inflation of an annular distensible tube or bag 18, to which fluid under pressure may be admitted through an opening 18a. It will be obvious that inflation of the tube 18 will move the member 17 and disk 16 in an axial direction (i. e. along the axis about which the rotatable parts of the brake assembly rotate) to force disk 16 into frictional contact with rotating disk 13 and to thereafter slide disk 13 axially along keys 12 to bring it also into contact with stationary disk 15. The friction created by squeezing rotating disk 13 between stationary disks 15 and 16 is intended to impede and eventually stop rotation of the drum 11 and of the vehicle wheel with which it is associated. A spring 25 bears against fixed support 14 and against disk 16 and, being in compression between them, urges disk 16 and through it inflatable tube 18 toward released position. It will be appreciated that a plurality of such springs may be provided around the circumference of the brake.

Frictional contact between the disk 13 and disks 15 and 16 will cause wear of said disks, particularly disk 13. In order that such wear will not leave slack in the brake applying system, I have provided an automatic adjustment device for retaining the clearance between disk 16 and support 14 substantially constant at all times. The automatic adjustment device comprises a plunger 19 one end of which contacts the support 20 which is fixedly mounted on the vehicle and which retains the inflatable bag 18. The plunger 19 extends through an opening 21 in disk 16 and has a surface 22 which normally rests a short distance away from support 14 whenever the opposite end of the plunger is in contact with support 20. A knob or extension 23 of smaller diameter than the rest of the plunger may extend through a complementary opening in support 14 to keep the plunger in line. A pronged spring steel washer 24 is fixed by suitable means to disk 16 and has an opening through the center thereof, preferably of slightly less diameter than the diameter of plunger 19. This spring washer acts as a one-way clutch in controlling movement of plunger 19 relative to disk 16. Plunger 19, whenever force is exerted against its surface 22 may move to the right relative to disk 16 by flexing slightly the spring washer 24. However, movement of plunger 19 toward the left relative to disk 16 is prevented by spring washer 24, since such movement of the plunger would tend to wedge the inner portion of the washer between the plunger and disk 16.

The clearance between surface 22 of plunger 19 and support 14 when disk 16 is in released position should be equivalent to the desired clearance in the brake. During operation of the brake, when pressure is created in the expansible tube 18, the clearance between surface 22 of plunger 19 and support 14 is first taken up. If any lining is worn off during brake application, the spring washer 24 slides on the plunger or rod 19 the exact amount that the lining has worn. On release of the brake return springs 25 return disk 16 until the rod or plunger 19 has contacted fixed support or plate 20. By maintaining a light constant pressure in the fluid pressure system, the inflatable tube 18 will be caused to follow up disk 16 whenever adjustment causes the disk to be moved in the direction of rotating disk 13. The chief problem which complicates the provision of automatic adjustments for drum type brakes is not present here, inasmuch as expansion due to heat will not effect the adjustment described herein. It is desirable that three or four of these automatic units be used in each brake, the units being spaced about the circumference of the brake.

While a single embodiment of my invention has been described, it will be apparent that various modifications can be made coming within the scope of my invention and it is therefore my desire to be limited in scope only by the terms of the following claims.

What is claimed is:

1. In a disk brake having an axially movable member and an axially fixed member, an automatic adjustment for maintaining substantially constant clearance in release between the members comprising an element which is movable relative to the axially movable member by contact with the axially fixed member and which determines the position in release of the axially movable member, and a one-way clutch connecting the element to allow movement of the element relative to the axially movable member in the direction urged by contact with the fixed member but prevent movement of the element relative to the axially movable member in the opposite direction, said one-way clutch consisting of a spring washer fixed to said axially movable member and a plurality of radially inwardly extending fingers engaging said element.

2. A brake assembly comprising a fixed member, a rotatable member which is axially movable to come into frictional contact with the fixed member, a non-rotatable but axially movable member, means for exerting a pressure against the last-named member to force it into frictional contact with the rotatable member and press the rotatable member against the fixed member, resilient means urging the non-rotatable but axially movable member away from the fixed member toward released position, and means for determining the released position of the non-rotatable but axially movable member including a stop and an element contacting the stop and having a one-way clutch connection with the non-rotatable but axially movable member, said one-way clutch connection comprising a spring washer encircling said element, said element extending toward the fixed member and being movable toward the stop whenever it contacts the fixed member during application of the brake by the aforesaid pressure exerting means.

3. A disk brake assembly comprising a fixed member, a rotatable disk which is axially movable to come into frictional contact with the fixed member, a non-rotatable but axially movable disk, means for exerting a pressure against the last-named disk to force it into frictional contact with the rotatable disk and press the rotatable disk against the fixed member, resilient means urging the non-rotatable but axially movable disk away from the fixed member toward released position, and means for determining the released position of the non-rotatable but axially movable disk including a stop, an element contacting the stop, and a spring washer connecting the element to the non-rotatable but axially movable disk and acting as a one-way clutch, said element extending toward the fixed member and being movable relatively to the non-rotatable but axially movable member whenever said element contacts the fixed member during application of the brake by the aforesaid pressure exerting means.

4. In a disk brake having an axially movable member, an axially fixed member, a rotatable member therebetween, and means for bringing the aforesaid members into frictional engagement with one another, an automatic adjustment for maintaining substantially constant clearance in release between the axially movable member and the axially fixed member comprising an element movable relative to the axially movable member by contact with the axially fixed member, and a one-way clutch consisting of a spring washer peripherally fixed to said axially movable member and having a plurality of radially inwardly extending and slightly bowed fingers engaging the axially movable member to allow movement of the element relative to the axially movable member in the direction urged by contact with the fixed member but to prevent movement of the element relative to the axially movable member in the opposite direction.

5. In a disk brake having an axially movable member, an axially fixed member, a rotatable member therebetween, and means for bringing the aforesaid members into frictional engagement with one another, an automatic adjustment for maintaining substantially constant clearance in release between the axially movable member and the axially fixed member comprising an element which is movable relative to the axially movable member by contact with the axially fixed member and which determines the position in release of the axially movable member, and a one-way clutch consisting of a spring washer peripherally secured to the axially movable member and having a plurality of radially inwardly extending and slightly bowed fingers engaging the element to allow movement of the element relative to the axially movable member in the direction urged by contact with the fixed member but to prevent movement of the element relative to the axially movable member in the opposite direction.

6. An automatically adjusted disk brake comprising a fixed brake member, an axially movable non-rotatable brake member, a rotating and axially movable disk between said brake members, an element supported on the axially movable non-rotatable brake member and extending past the rotating disk to contact the fixed brake member, said element being caused to move relative to said axially movable non-rotatable brake member by contact with said fixed brake member, and a one-way clutch connecting said element to said axially movable non-rotatable brake member to allow movement of the element relative to said member in the direction in which it is urged by contact with the fixed brake member and prevent relative movement of said element in the opposite direction.

7. An automatically adjusted disk brake comprising a fixed brake member, an axially movable non-rotatable brake member, a rotating and axially movable disk between said brake members driven by means acting at its periphery, an element supported on the axially movable non-rotatable brake member and located radially inwardly of the rotating disk, said element extending past said disk to contact the fixed brake member, said element being caused to move relative to said axially movable non-rotatable brake member by contact with said fixed brake member, and a one-way clutch connecting said element to said axially movable non-rotatable brake member to allow movement of the element relative to said member in the direction in which it is urged by contact with the fixed brake member and prevent relative movement of said element in the opposite direction.

RUDOLPH A. GOEPFRICH.